Oct. 12, 1948.  R. A. HARTMAN  2,451,438
FASTENING DEVICE
Filed Nov. 13, 1944
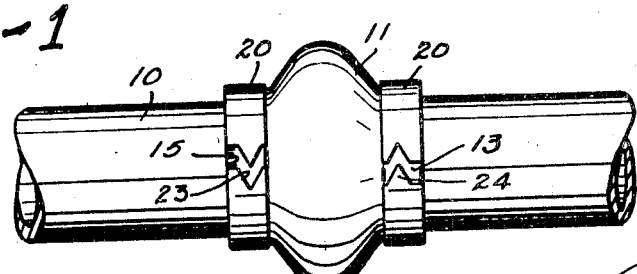
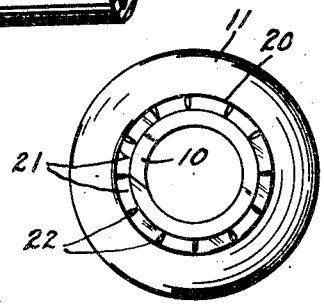
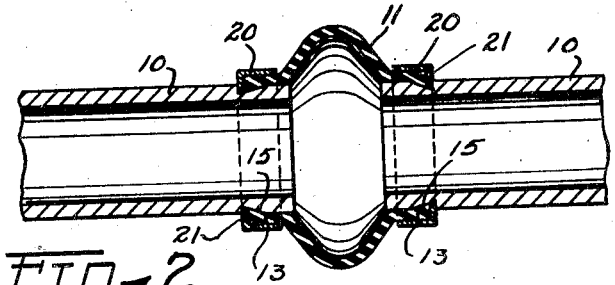
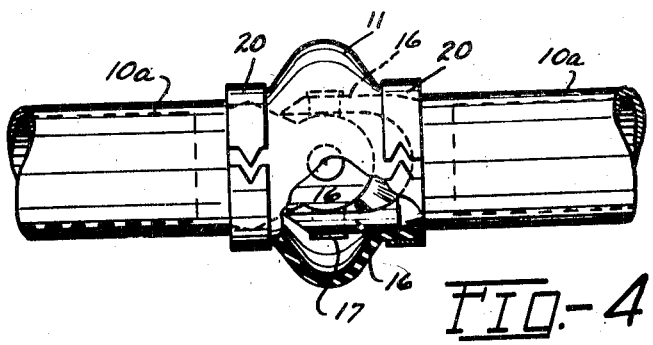
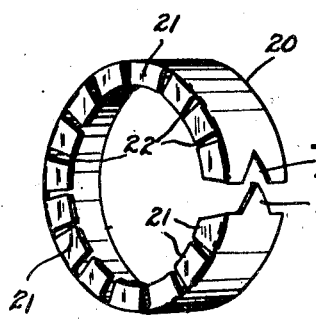
INVENTOR.
RICHARD A. HARTMAN
BY
ATTORNEYS Patented Oct. 12, 1948

2,451,438

UNITED STATES PATENT OFFICE 2,451,438

FASTENING DEVICE

Richard A. Hartman, Cleveland, Ohio, assignor to Tinnerman Products, Inc., Cleveland, Ohio, a corporation of Ohio Application November 13, 1944, Serial No. 563,287

3 Claims. (Cl. 285—90)

1

This invention relates to fastening devices for clamping sleeves to members which they surround. It is especially well adapted for clamping the ends of yielding sleeves which surround rods or pipes. An illustration of the use of such a sleeve is a flexible coupling between two conduits or a dust proof covering for a universal joint. In such cases the yielding sleeve frequently has an outwardly bowed central region terminating on opposite sides in cylindrical flanges snugly embracing the rods or pipes. My invention provides fastening means in the form of partially annular resilient rings which snugly embrace such flanges to hold them tightly on the surrounded rods or pipes, and also coact with such rods or pipes to hold the fastening device in place.

An object of the invention is to provide such a ring fastener in a form which may be readily applied over the end flanges of the sleeve and by its own resiliency hold the flange tightly clamped on the surrounded member. Another object is to so form the fastening device and the surrounding member that when the fastening device is in place it is automatically interlocked to the member in a manner to prevent longitudinal shifting thereon. Another object is to provide the fastening device in the form which will protect the end of the yielding sleeve from injury or wear. These and other features of the invention will be more apparent from the detailed description of the preferred embodiment illustrated in the drawings.

In the drawings, Fig. 1 is a side elevation of a pair of aligned conduits connected by a yielding coupling sleeve, the edges of which are clamped by my fastening devices; Fig. 2 is a longitudinal diametric section through the construction of Fig. 1; Fig. 3 is an end elevation of this embodiment; Fig. 4 is a side elevation partly in section of a universal joint construction having its dust protector held by my fastening devices; Fig. 5 is a perspective of the fastening device itself.

In Figs. 1 and 2, I have shown a pair of aligned pipes 10 spaced apart and connected by a sleeve 11 clamped to the pipes by two of my fasteners 20. The connecting sleeve is preferably of rubber or rubber-like material and it frequently has an outwardly bowed intermediate region as shown in the drawing, but its end portions constitute cylindrical flanges designated 13 which snugly embrace the respective pipes.

My fastening device 20 comprises a single strip of resilient sheet material, preferably spring steel or alloy, bent into a nearly complete cylindrical form and having one edge thereof periodically notched and flanged inwardly to provide a row

2 of arcuately aligned tongues. The tongues are designated 21 in Figs. 3 and 5 and the notches 22. These notches are substantially radial when the strip is in its final position. They are preferably of such width that the corners of adjacent tongues substantially contact with each other to make a closed inner periphery of the notched flange. The spacing of these corners is somewhat exaggerated in Fig. 5 for clearness of illustration.

One end of the body of the strip is preferably notched as shown at 23, the other has a complementarily formed tongue 24, which is adapted to extend to varying degrees into the notch 23. This allows a certain leeway in the approach of the ends of the strip toward each other while enabling the embraced flange of the sleeve to be substantially covered.

Each pipe 10 is provided near its end with an external groove 15, this groove preferably having a bottom surface inclining inwardly in a direction away from the end of the pipe and having its distant wall normal to the axis of the pipe. When my fastening is applied, the inner edge of its notched flange seats in this groove and abuts the wall thereof normal to the axis.

It results from the construction described, that the yielding sleeve is effectively clamped snugly about the member in place and at the same time the fastening device is automatically locked against shifting longitudinally away from the sleeve.

My fastening device may also operate to force the yielding flange into the groove 15 and thus increase the effectiveness of its attachment to the member embraced. This seating of the yielding sleeve in the groove, as indicated in Fig. 2, is most readily made by providing a slight inward bead or turned-in end on the yielding flange when it is constructed, then the clamping of the fastening device forces such bead or inturned end into the groove.

In the universal joint construction of Fig. 4, the same clamping devices are shown as clamping the same character of sleeve 11 on a pair of universal joint rods 10a. These rods may be tubular but at their inner ends each is formed into or carries a fork 16 which are pivotally connected at four regions 90° apart to a connecting member 17 as usual in universal joints.

It will be observed from the drawings that the notched flange on my fastening device, is the same as when the device is applied, makes a substantially complete closure across the end of the yielding flange embraced by the fastener. The flange is thus protected from wear or injury in its most vulnerable region.

My fastening device may readily be constructed from a single straight strip of flat resilient spring steel or alloy having a width equal to the longitudinal width of the body plus the radial width of the notched flange. The notches formed along one edge extend to a depth corresponding to such radial width. The notches as formed in the flat strip may conveniently be parallel-sided and they are of such width that when the fastener is curved into its cylindrical form the corners of the tongues provided are substantially in contact with each other. The end portions of the blank are formed with the end tongue and end notch shown. After such stamping or cutting operation the notched side portion may be bent over at right angles to form the flange and the strip then given the cylindrical form of Fig. 5.

The device normally tends to form a complete ring with the end tongue occupying the end notch. Fig. 5 showing the device in a slightly spread form. In applying it, it is spread slightly so that the inner periphery of the flange rests on the ungrooved portion of the pipe or rod and then on being shoved longitudinally the body of the fastener passes over the flange of the sleeve and then the fastener springs into place with its flange occupying the groove and abutting the outer wall thereof as shown.

I claim:

1. The combination with a sleeve and a member which it embraces having a shoulder adjacent the end of said sleeve of a fastening device comprising a partial ring of resilient material embracing the sleeve and by its own resilience clamping it on the member and having an edge flange extending inwardly across the end of the sleeve and having its outer face engaging the shoulder on said member.

2. The combination of a member having a groove about it, said groove being formed with inclined bottom leading inwardly away from the end of the member and an end wall in a plane normal to the axis of the member, a sleeve embracing the member and seated in said groove, and a fastening device comprising a partial ring of resilient material embracing the end of said sleeve, said fastening device having a periodically notched edge flange extending in the same groove and engaging said end wall.

3. The combination of a member having a groove about it, a yielding sleeve embracing the member and overhanging the groove and a fastening device embracing the sleeve over the groove and comprising a separable ring of resilient material having a periodically notched edge flange projecting inwardly at a right angle to the body of the device and extending across the end of the sleeve into the groove and engaging the wall of said groove, the sleeve having an inward projection extending into the groove and there held by the fastening device, the fastening device when unapplied having an internal diameter less than the external diameter of the member adjacent the groove, whereby resilience of the ring alone maintains it in clamping position, one end of the ring of the fastening device being provided with a tongue and the other end with an open notch receiving said tongue.

RICHARD A. HARTMAN.

REFERENCES CITED

The following references are of record in the file of this patent:

UNITED STATES PATENTS

| Number | Name | Date |
|---|---|---|
| 576,119 | Hess | Feb. 2, 1897 |
| 721,577 | Lindner | Feb. 24, 1903 |
| 809,903 | Bowers | Jan. 9, 1906 |
| 1,497,549 | Conradi | June 10, 1924 |
| 1,748,702 | Breer | Feb. 25, 1930 |
| 2,290,776 | Stillwagon | July 21, 1942 |